United States Patent [19]

Yessaian

[11] 4,028,247
[45] June 7, 1977

[54] VIBRATORY COOLANT STRAINER FOR MACHINE TOOL COOLANT SYSTEMS

[76] Inventor: Harry A. Yessaian, 1035 Ridgemont Drive, Union Lake, Mich. 48085

[22] Filed: July 7, 1975

[21] Appl. No.: 593,646

[52] U.S. Cl. .............................. 210/153; 210/168; 210/388; 210/391

[51] Int. Cl.² ...................................... B01D 33/00

[58] Field of Search ............ 210/79, 167, 168, 383, 210/384, 359, 388, 391, 402, 407, DIG. 18, 153; 55/300; 209/379, 381, 382

[56] References Cited

UNITED STATES PATENTS

| 2,578,636 | 12/1951 | Smith et al. | 210/388 X |
| 3,802,566 | 4/1974 | Hata | 210/383 X |
| 3,841,488 | 10/1974 | Yessaian | 210/168 |
| 3,855,131 | 12/1974 | Thumberger | 210/407 X |

Primary Examiner—Frank W. Lutter
Assistant Examiner—William A. Cuchlinski, Jr.
Attorney, Agent, or Firm—Robert G. Mentag

[57] ABSTRACT

A vibratory coolant strainer for a cutting tool coolant supply system for a machine tool. A strainer screen assembly is rotatably mounted on a coolant system fixed supply pipe. A yoke is attached to the upper section of the strainer screen assembly and it is rapidly vibrated by a plural lobe cam which imparts a rapid vibratory or rotary oscillating motion to the strainer screen assembly so as to free it of metal chips and other dirt. The plural lobe cam is secured to a rotatably mounted shaft which is operatively supported in a housing attached to the supply pipe. The cam shaft may be driven by a suitable motor, or a belt or chain from a power source which is internal or external of the machine tool.

4 Claims, 3 Drawing Figures

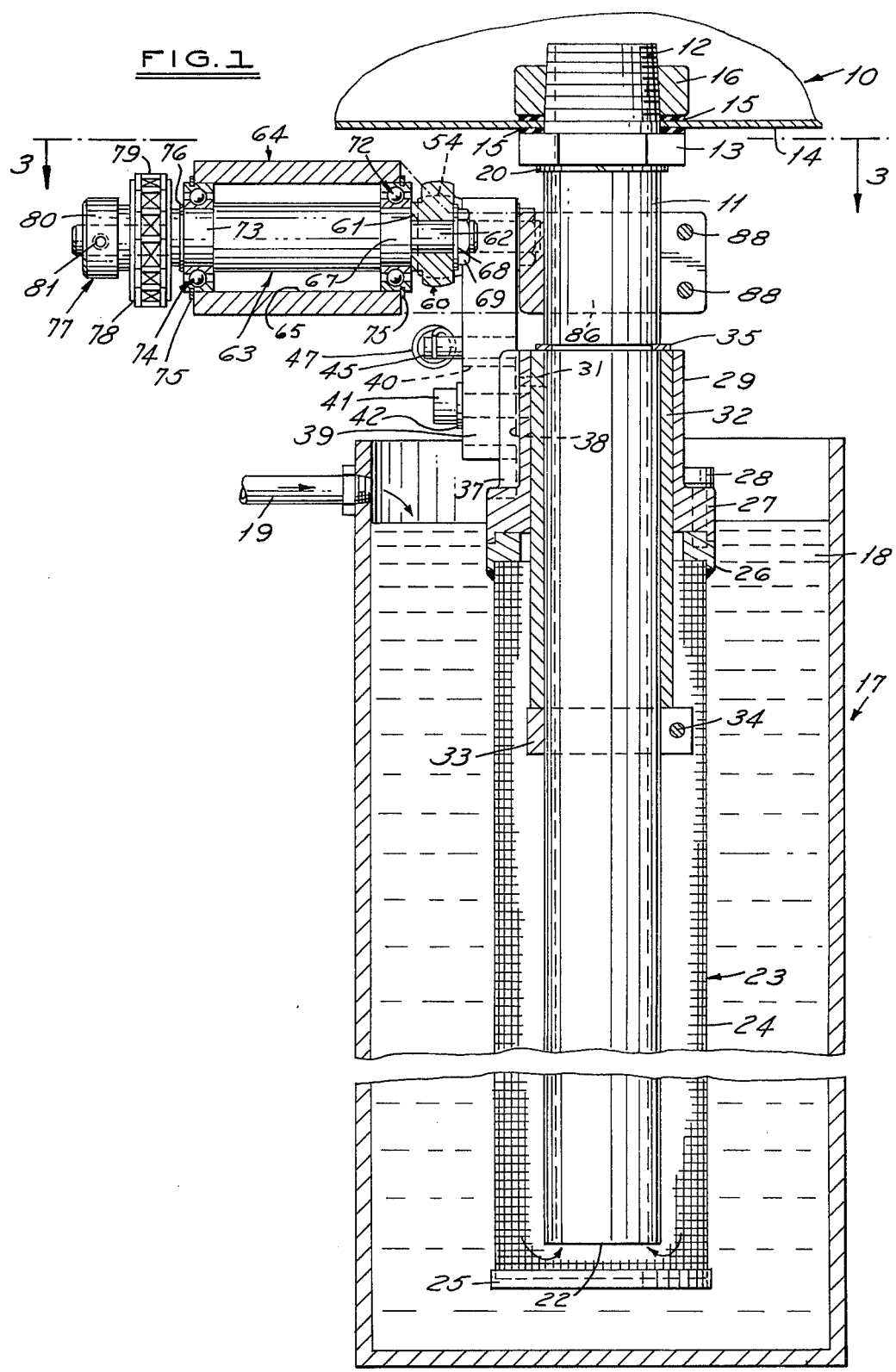

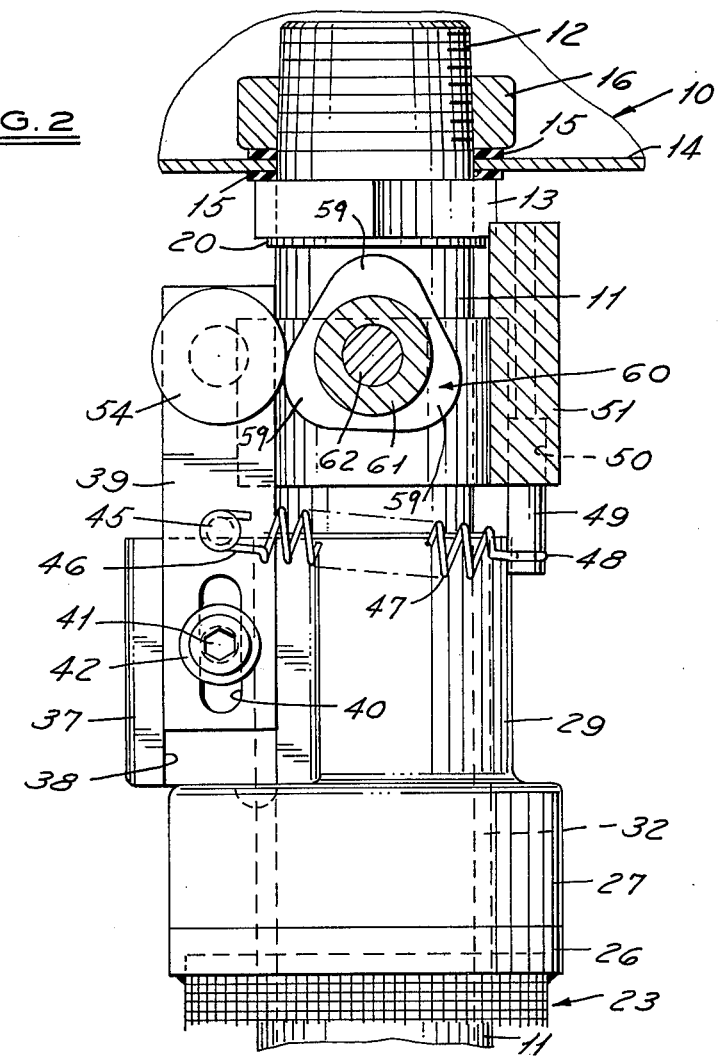
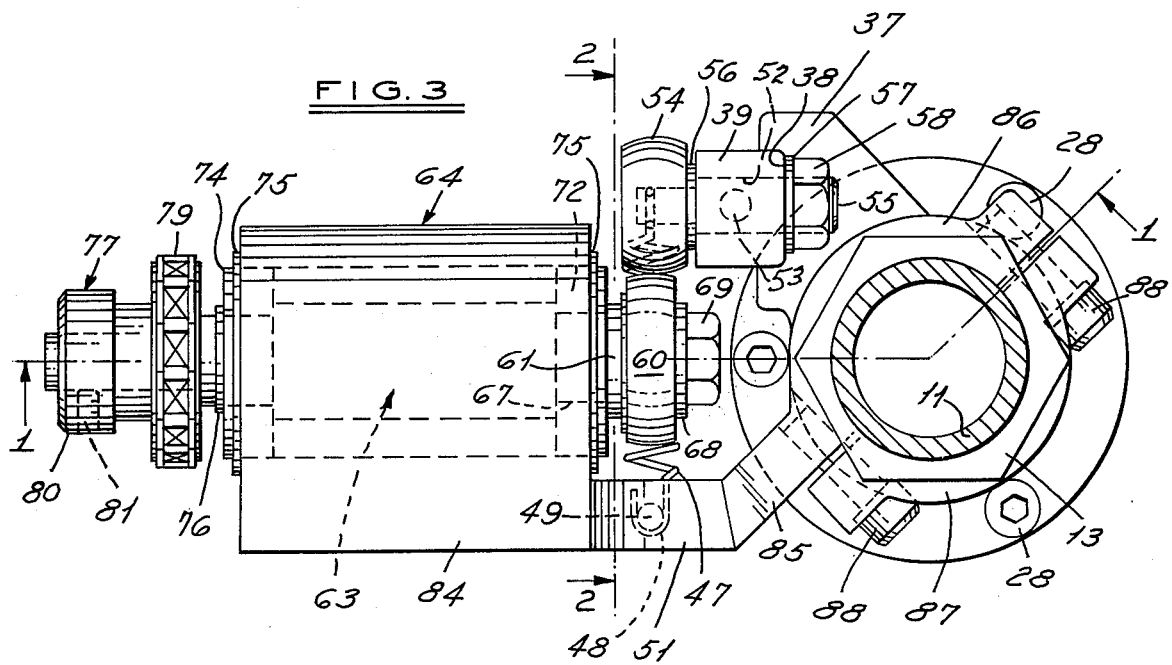

VIBRATORY COOLANT STRAINER FOR MACHINE TOOL COOLANT SYSTEMS

SUMMARY OF THE INVENTION

This invention relates generally to the machine tool art and in particular to a vibratory coolant strainer means for a machine tool cutting oil system.

The coolant oil used in a machine tool for cooling the cutting tools is recirculated for reuse, and in the course of such recirculation, it must pass through a coolant reservoir and a coolant strainer means. A disadvantage of the prior art cutting tool coolant systems is that the coolant strainer means employed in such systems are subject to a build-up on the outer surface thereof of dirt particles, metal chips and the like, which are carried back to the coolant reservoir after the coolant oil has passed over cutting tools during a cutting operation. Such build-up of dirt and chips on the coolant strainer means causes the coolant pump to starve for oil, and such action causes a decrease in cutting tool coolant, and sometimes a complete loss of cutting tool coolant, which in turn causes the cutting tools to burn up, break or be damaged in some way. The aforementioned loss of cutting tool coolant causes machine down time so that the damaged tools must be taken out, reground and reset for further cutting action. U.S. Pat. No. 3,841,488 provides a strainer system which overcomes some of the aforementioned disadvantages; however, the strainer system of the present invention is still more advantageous.

In view of the foregoing, it is an important object of the present invention to provide a vibratory or rotary oscillating coolant strainer assmebly which is adapted to overcome the aforementioned disadvantages of the prior art machine tool coolant systems.

It is a further object of the present invention to provide a novel and improved vibratory or rotary oscillating coolant strainer assembly for a cutting tool coolant system on a machine tool, which is simple and compact in construction, economical to manufacture, efficient in operation, and which can be driven by a suitable motor, or a belt or chain operated by a power source which is internal or external of the machine tool.

It is still another object of the present invention to provide a vibratory or rotary oscillating strainer assembly for a cutting tool coolant system on a machine tool, which is adapted to be rotatably mounted on the coolant pump fixed supply pipe that extends into the coolant system's reservoir, and which includes means for oscillating the coolant strainer assembly on the supply pipe in a vibratory and rotary motion.

It is a further object of the present invention to provide a vibratory or rotary oscillating strainer for a machine tool cutting tool coolant supply system which is operatively disposed in the reservoir of said system. The coolant strainer assembly is rotatably mounted on the fixed supply pipe of the coolant system which supplies coolant to the pump of the coolant system. A mounting means fixed to the strainer assembly screen for moving the strainer screen about said fixed supply pipe to provide a rotary oscillating or vibratory motion to the strainer screen. A constantly rotating plural lobe cam means is operatively engaged by the mounting means to vibrate said mounting means and strainer screen.

BRIEF DESCRIPTION OF THE DRAWINGS

FIG. 1 is a side elevation view of a rotary, vibratory, oscillating strainer for a machine tool coolant system made in accordance with the principles of the present invention, with parts in section and with parts broken away.

FIG. 2 is a fragmentary, left side elevation view of the strainer stucture illustrated in FIGS. 1 and 3, taken along the line 2—2 of FIG. 3, and looking in the direction of the arrows.

FIG. 3 is a fragmentary, horizontal plan view, with parts in section and parts broken away, of the strainer structure illustrated in FIG. 1, taken along the line 3—3 thereof, and looking in the direction of the arrows.

DESCRIPTION OF THE PREFERRED EMBODIMENT

Referring now to the drawings, and in particular to FIGS. 1 and 2, the numeral 10 generally represents a machine tool which is provided with a coolant system including a vibratory or rotary oscillating strainer made in accordance with the principles of the present invention. The machine tool 10 may be any conventional machine tool, as for example, an automatic machine tool which has one or more cutting tools supplied with a suitable coolant oil as 18 from a coolant system reservoir generally indicated by the numeral 17.

The numeral 11 indicates the usual coolant oil supply or inlet pipe for transferring coolant oil 18 from the coolant oil reservoir 17 to a suitable pump (not shown) for distribution to a cutting tool or tools on the machine tool 10. The inlet pipe 11 extends downwardly into the reservoir 17, and the lower intake end thereof is indicated by the numeral 22. The numeral 16 designates a suitable lock nut, and the numeral 15 indicates a pair of suitable seals for coaction with the lock nuts 16 and a retainer collar 13 for securing the intake pipe 11 to a portion of the machine tool 10 for connection to the coolant pump. The collar 13 is retained in position on the pipe 11 by a releasable snap ring 20. The pipe 11 may also be threadably attached directly to the coolant pump.

As shown in FIG. 1, the reservoir 17 is supplied with a mixture of cutting tool coolant oil and chips through the return pipe 19, which returns used cutting tool coolant oil for recirculation and further use. The oil is drawn through an elongated strainer screen assembly, generally indicated by the numeral 23, which is oscillated or vibrated with a rotary motion to prevent the build-up on the outer surface thereof of any chips or other dirt that would prevent passage of the cutting tool coolant oil through the strainer assembly 23 and into the open end 22 of the pipe 11.

The strainer screen assembly 23 includes a cylindrical strainer screen 24 which is disposed around the inlet pipe 11 and which is provided with a closed lower end 25. Fixedly secured by any suitable means to the upper end of the strainer screen 24 is a mounting collar 26 which is secured by a plurality of suitable machine screws 28 to a second mounting collar 27. A mounting sleeve 29 is integrally formed on the upper end of the mounting collar 27 and it is fixedly mounted on an internal sleeve bearing 32, by a suitable retainer pin 31. The sleeve bearing 32 may be press-fitted or secured to the sleeve 32 by any other suitable means. The sleeve bearing 32 is rotatably mounted on the inlet pipe 11, and it is secured in axial position thereon, by a support collar 33 which engages the lower end thereof. The support collar 33 is secured in a desired adjusted longitudinal position on the pipe 11 by a suitable retainer screw 34. A releasable retainer snap ring 35 is operatively secured to the inlet pipe 11 at a point above the sleeve bearing 32 for engaging the upper end of the sleeve bearing 32 to limit upward movement of the same on the pipe 11.

As best seen in FIG. 2, the mounting collar sleeve 29 is provided on one side thereof with a support arm 37, that has a vertical slot 38 in which is slidably received a cam follower roller mounting bar 39. The bar 39 is releasably secured to the support arm 37 by any suitable means, as by a machine screw 41 and washer 42. As shown in FIG. 2, the machine screw 41 passes through a longitudinally extended slot 40 in the mounting bar 39 and thence into threaded engagement with the support arm 37. The slot 40 permits adjustment of the mounting bar 39 upwardly and downwardly. As shown in FIGS. 2 and 3, a cam follower roller 54, having a curved peripheral surface, is rotatably mounted on one end of a shaft 55. The other end of the shaft extends through a suitable bore 52 formed through the upper end of the mounting bar 39. A spacer washer 56 is mounted between the cam follower roller 54 and the adjacent face of the mounting bar 39. The shaft 55 is retained against rotation by a suitable retainer screw 53, as shown in FIG. 3. The shaft 55 is secured against longitudinal movement by a washer 57 and lock nut 58. It will be seen that the strainer screen assembly 23 and the cam follower roller 54 are mounted on the pipe 11 for rotation thereabout.

As shown in FIG. 2, the cam follower roller 54 is normally biased into operative engagement with the outer periphery of a plural lobed cam, generally indicated by the numeral 60. The cam 60 has three lobes 59 which are equally spaced apart. The cam follower roller 54 is biased into operative engagement with the cam 60 by a coil spring 47 which has one end 46 attached by a retainer pin 45 to the mounting bar 39. The other end 48 of the spring 47 is attached by a retainer pin 49 which is mounted in a suitable bore 50 formed in the lower end of a support arm 51. The retainer pins 45 and 49 may be fastened in place by any suitable means, as by a press-fit.

As shown in FIG. 1, the cam 60 is operatively mounted on the inner reduced end 62 of a shaft generally indicated by the numeral 63. The shaft 63 is rotatably mounted in a cylindrical chamber 65 in a housing generally indicated by the numeral 64. The end portion of the shaft 63 adjacent portion 62 is reduced in diameter as indicated by the numeral 67, and it is rotatably mounted in a suitable ball bearing means 72. The cam 60 is provided on the inner face with a cylindrical extension 61 which abuts against the inner race of the ball bearing means 72. Cam 60 is held in position on the shaft end 62 by a suitable washer 68 and lock nut 69. The outer race of the ball bearing means 72 is retained in place in one end of the chamber 65 by a suitable retainer snap ring 75. The other end of the shaft 63 is supported by a reduced end portion 73 that is operatively mounted in the inner race of a ball bearing means 74. The outer race of the ball bearing means 74 is mounted in the other end of the chamber 65 by a suitable retainer snap ring 75. The shaft portion 73 is held against logitudinal movement in one direction, relative to the inner race of the ball bearing means 74, by a shoulder formed between the main part of the shaft 63 and the reduced end portion 73, and in the other direction by a suitable retainer snap ring 76.

As shown in FIGS. 1 and 3, a drive sprocket 78 is fixedly mounted on the extreme outer reduced end of the cam shaft 63 by any suitable means. The sprocket 78 is spaced from the bearing member 74, and it is integrally connected by a sleeve member 82 that is integral with an attachment collar 80. The attachment collar 80 is retained in place on the extreme outer end of the shaft 63 by a suitable set screw 81.

As shown in FIGS. 1 and 3, the sprocket 78 is driven by a suitable chain 79. The chain 79 would be operatively connected to and driven by a power drive means within the tool 10, as for example, a rotating shaft. The chain 79 may also be driven by a suitable external drive motor means or other power drive means. The drive chain 79 provides the cam shaft 63 with a suitable constant rotation.

As shown in FIG. 3, the cam shaft housing 64 is provided with an extension 84 on one side thereof which is integrally formed with the support arm 51. The support arm 51 is integrally connected to an adjacent support arm 85 which is integrally attached to a semicircular attachment arm 86. The semicircular attachment arm 86 is disposed around the upper end of the inlet pipe 11, at a position above the strainer screen assembly 23. A second semicircular attachment arm 87 is disposed around the inlet pipe 11, in a mating and aligned position with the first mentioned attachment arm 86. The attachment arms 86 and 87 are fixedly secured together by suitable machine screws 88, so as to fixedly retain the cam shaft housing 64 in a fixed position relative to the inlet pipe 11.

In use, the chain 79 drives the sprocket 78 which in turn directly rotates the shaft 63 with a suitable constant rotation, so as to rotate the plural lobed cam 60 which in turn moves the cam follower roller 54 to the left, as viewed in FIG. 2. The coil spring 47 returns the roller 54 and its attached structure to the right, as viewed in FIG. 2, after each movement to the left by a cam lobe 59. The roller 54 and the attached strainer screen assembly 23 are thus provided with a rotary oscillating motion. A continuous rotary oscillating movement of the strainer screen assembly 23 provides a vibratory, agitating action which shakes off chips and other dirt from the outer face of the screen 24 and prevents a build-up of such material on the screen 24. The dirt and chips in the coolant oil 18 exist in the coolant oil by the fact that the coolant oil used in machine tools is continuously recirculated and reused. The coolant oil is pumped up to the cutting tools and performs its cooling function, and then it is returned to the reservoir 17 for recirculation and reuse.

While it will be apparent that the preferred embodiment of the invention herein disclosed is well calculated to fulfill the objects above stated, it will be appreciated that the invention is susceptible to modification, variation and change.

What is claimed is:

1. In a machine tool having a cutting tool coolant system including a coolant reservoir and a fixed coolant supply pipe extended into the reservoir, the combination comprising:

a. a coolant strainer assembly operatively disposed in said reservoir;
   b. means movably supporting said coolant strainer assembly on said fixed supply pipe for oscillating rotary movement thereabout, with said supply pipe extended into said strainer;
c. means for oscillating in a rotary motion said means for movably supporting the strainer assembly on said supply pipe to provide a vibrating, rotary oscillating motion to said strainer assembly to prevent a build-up of dirt and the like on the outer surface of said strainer assembly;
d. said means movably supporting said coolant strainer assembly including a mounting means attached to a strainer screen in said coolant strainer assembly; and,
e. said oscillating means includes:
 1. a cam follower means attached to said mounting means; and,
 2. a cam drive means engaged with said cam follower means for moving said cam follower means in one direction.

2. In a machine tool coolant system, the combination as defined in claim 1, wherein said oscillating means includes:
a. a spring return means having one end fixed to the fixed coolant supply pipe and the other end attached to said cam follower means for moving said cam follower means in the other direction.

3. In a machine tool having a cutting tool coolant system, including a coolant reservoir and a fixed coolant supply pipe extended into the reservoir, the combination comprising:
a. a coolant strainer assembly operatively disposed in said reservoir;
b. means movably supporting said coolant strainer assembly on said fixed supply pipe for oscillating rotary movement thereabout, with said supply pipe extended into said strainer;
c. means for oscillating in a rotary motion said means for movably supporting the strainer assembly on said supply pipe to provide a vibrating, rotary oscillating motion to said strainer assembly to prevent a build-up of dirt and the like on the outer surface of said strainer assembly;
d. said means movably supporting said coolant strainer assembly including a mounting means attached to a strainer screen in said coolant strainer assembly;
e. said oscillating means including,
 1. a cam follower means attached to said mounting means;
 2. a cam drive means engaged with said cam follower means for moving said cam follower means in one direction;
 3. a spring return means attached to said cam follower means for moving said cam follower means in the other direction; and,
f. said mounting means including a bearing means rotatably mounted on said coolant supply pipe, and a mounting sleeve operatively attached to said strainer screen.

4. In a machine tool having a cutting tool coolant system, including a coolant reservoir and a fixed coolant supply pipe extended into the reservoir, the combination comprising:
a. a coolant strainer assembly operatively disposed in said reservoir;
b. means movably supporting said coolant strainer assembly on said fixed supply pipe for oscillating rotary movement thereabout, with said supply pipe extended into said strainer;
c. means for oscillating in a rotary motion said means for movably supporting the strainer assembly on said supply pipe to provide a vibrating, rotary oscillating motion to said strainer assembly to prevent a build-up of dirt and the like on the outer surface of said strainer assembly;
d. said means movably supporting said coolant strainer assembly including mounting means attached to a strainer screen in said coolant strainer assembly;
e. said oscillating means including:
 1. a cam follower means attached to said mounting means;
 2. a cam drive means engaged with said cam follower means for moving said cam follower means in one direction, and,
 3. a spring return means attached to said cam follower means for moving said cam follower means in the other direction;
f. a shaft rotatably mounted in a housing that is carried on said coolant supply pipe; and,
g. a plural lobed cam mounted on said shaft and engageable with said cam follower means.

* * * * *

UNITED STATES PATENT OFFICE
CERTIFICATE OF CORRECTION

Patent No. 4,028,247  Dated June 7, 1977

Inventor(s) Harry A. Yessaian

It is certified that error appears in the above-identified patent and that said Letters Patent are hereby corrected as shown below:

Column 1, line 35, after "strainer", "assmebly" should be --assembly--.

Column 1, line 59, after "coolant" and before "system", insert --supply--.

Signed and Sealed this

Eleventh Day of October 1977

[SEAL]

Attest:

RUTH C. MASON
Attesting Officer

LUTRELLE F. PARKER
Acting Commissioner of Patents and Trademarks